United States Patent
Fernlund et al.

[15] 3,663,074
[45] May 16, 1972

[54] ARRANGEMENT IN SPIRAL GROOVE BEARINGS

[72] Inventors: Lars Martin Ingemar Fernlund, Hindas; Erik Magnus Kellstrom, Partille, both of Sweden

[73] Assignee: SKF Industrial Trading and Development Company N.V., Amsterdam, Netherlands

[22] Filed: May 27, 1970

[21] Appl. No.: 40,969

[30] Foreign Application Priority Data

May 27, 1969 Sweden..................................7407/69

[52] U.S. Cl. ............................................................308/9
[51] Int. Cl. ......................................................F16c 17/04
[58] Field of Search..............................................308/9, 160

[56] References Cited

UNITED STATES PATENTS 3,154,353  10/1964  Haringx et al. ..........................308/9
3,497,273  2/1970   Muizderman et al......................308/9

Primary Examiner—Edgar W. Geoghegan
Assistant Examiner—Frank Susko
Attorney—Howson and Howson

[57] ABSTRACT

A bearing system lubricated with oil has been developed to carry heavy axial loads at high speeds on vertical spindles. At low speeds the spindle is supported by a ball bearing, whereas the axial load is taken over by a flat spiral groove bearing when the speed exceeds a predetermined value wherein the spiral groove bearing is given an optimum groove pattern by way of analysis.

1 Claim, 3 Drawing Figures

ARRANGEMENT IN SPIRAL GROOVE BEARINGS

BACKGROUND OF THE INVENTION

The present invention refers to an analysis of the bearing system in respect of temperature distribution under different operating conditions with the aid of a computer program universally applicable to different design parameters. This program, in combination with another one for optimization with a function varying with certain auxiliary conditions has also been used for the design of the spiral groove bearing in order to obtain maximum film-thickness or minimum power loss.

It can be mentioned that this problem earlier has been studied by Dr E. A. Muijderman in his dissertation "Spiral Groove Bearings," Philips Techn. Library, 1966, regarding plain thrust bearings. At that time Muijderman studied the non-dimensional "load."

$$W_t \cdot h_2^2 1\eta \cdot \omega \cdot r_2^4$$

which is found to be a function of the parameters $\alpha, \delta, \gamma, \lambda$ and $k$. For given values of $\lambda$ and $k$ it is possible to find a maximum of this group and corresponding optimum values of $\alpha, \delta$, and $\gamma$. Using these results it is also possible to calculate a figure for the non-dimensional group including the friction torque $M_t$, viz.

$$M_t/h_2 \cdot W_2$$

Hence, the optimization of the groove pattern has aimed at a maximum load for a given viscosity and speed. The influence of the friction loss on the viscosity has not been considered. This holds true for a gas lubricated bearing.

SUMMARY OF THE INVENTION

The invention is characterized thereby that the parameters of the groove pattern have been determined by way of analysis bearing upon maximum film thickness, taking into consideration that the parameter of the non-dimensional load and the parameter of the friction are depending on each other in such a way that the energy of the friction settles the temperature of the pump medium, which in turn influences the value of viscosity of the lubricant.

DESCRIPTION OF THE PREFERRED EMBODIMENT

For elucidatory reasons it is now referred to the first two of the accompanying drawings.

Figure 1:
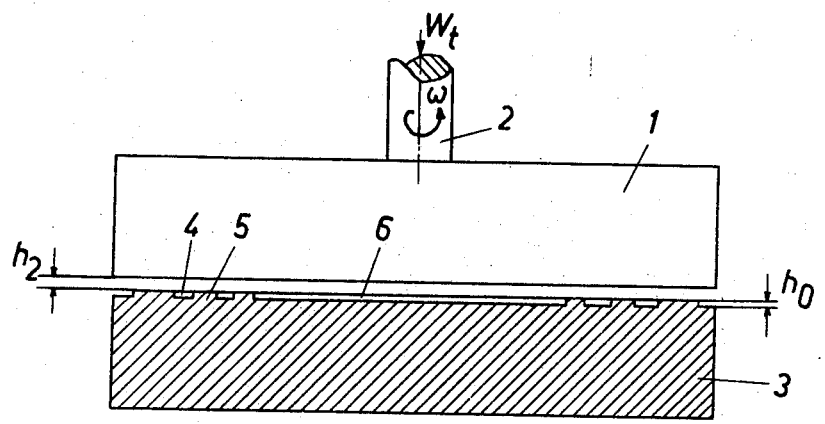
FIG. 1 shows a spiral groove bearing and
FIG. 2 shows the bearing plate provided with shallow grooves.
Figure 2:
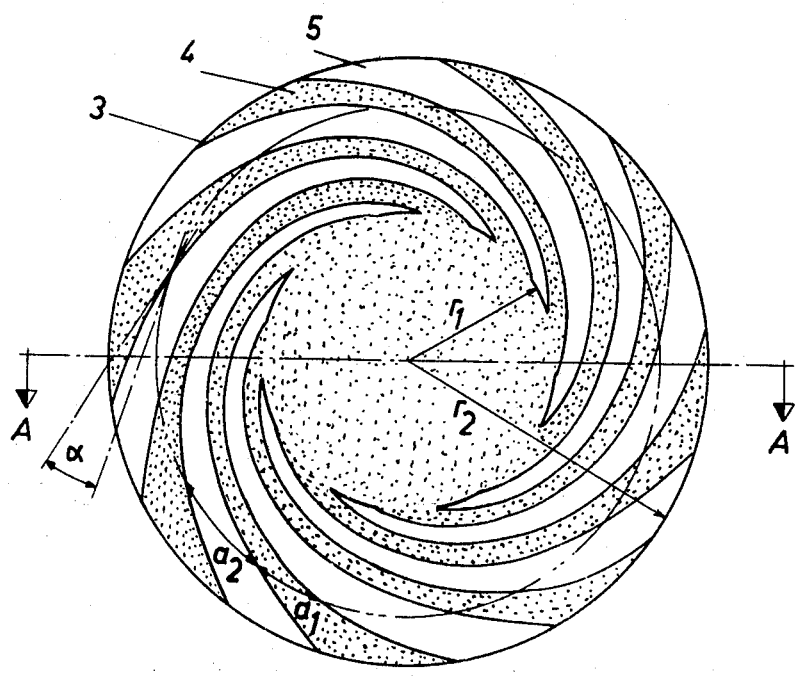

FIG. 1 shows a spiral groove bearing in a simplified form, and having the lower plate cut along lines A—A in FIG. 2.

FIG. 2 shows the lower bearing plate of the spiral groove bearing in FIG. 1.

In FIG. 1 an upper bearing plate 1 is attached to a shaft 2 which is rotated at a speed $\omega$ (rad/sec) and acted upon by a total load $W_t(N)$. The upper plate cooperates with a lower plate 3, which in its surface turned towards the upper plate is provided with a number $k$ of shallow spiral grooves 4 of logaritmic form. Between each two adjacent grooves there is one ridge 5, and the center of the plate is provided with a round recess 6. The depth of the grooves is $h_0$ (microns) and the thickness of the lubricating film is $h_2$ (microns) when the upper plate rotates at the speed $\omega$.

In FIG. 2 the lower plate 3 is shown in a plain view. The radius of the plate is $r_2$ (mm) and the radius of the recess $r_1$ (mm). The spiral grooves define an angle $\alpha$ which is measured between the tangents of the groove and a circle coaxial with the disc in the intersection point between groove and circle. The width of the grooves has a value $a_1$ and the ridges $a_2$, which are measured as the arc length of a common circle.

The parameters $\delta$, $\gamma$ and $\lambda$ is $h_2/h_0$, $a_2/a_1$, and $r_1/r_2$ respectively. For given values of $\lambda$ and $k$ it is possible to find a maximum of this group and corresponding optimum values of $\alpha$, $\delta$, and $\gamma$. Using these results it is also possible to calculate a figure for the non-dimensional group including the friction torque $M_t$, viz.

$$M_t/h_2 \cdot W_t$$

Hence, the optimization of the groove pattern has aimed at a maximum load for a given viscosity and speed. The influence of the friction loss on the viscosity has not been considered. This holds true for a gas bearing.

It is well known that the viscosity of oils is extremely dependent on temperature. This will be illustrated by some examples given below:

| Medium | Viscosity at 20° C. in N$_s$/m² | Viscosity at 100° C. in N$_s$/m² |
|---|---|---|
| Light oil | 0,02 | 0,0015 |
| Heavy oil | 0,15 | 0,0035 |

Hence, the viscosity of the light oil at 100° C. vis a vis that at 20° C. is decreased by a factor of 13,3. The corresponding value for a heavy oil is 43,0.

As the viscosity of the lubricant heavily influences the load capacity of the bearing, it is obvious that there is an urgent need to know the oil temperature as early as at the design state.

However, it is also clear that in an oil lubricated spiral groove bearing the mutual relationship between the two non-dimensional quantities mentioned above should be taken into account. This problem has been tackled in the following way;

There is a supposed system with a specified axial load $F_a$ acting on a flat spiral groove bearing with fixed inner and outer diameters and working in a certain oil. The relationship between the viscosity and the temperature can be expressed as $\eta = f_1(t)$. Further the temperature $t$ can be written as $t = (t_0 + \Delta t)$, where $t_0$ is the constant ambient temperature and $\Delta t$ the temperature rise. It is also assumed that the temperature rise and the power loss $P_t$ are related as $\Delta t = f_2(P_t)$. The problem is then to determine the quantities $\alpha$, $\gamma$, and $h_0$. This can be done by stipulating maximum film thickness $h_2$ or by minimizing the power loss $P_t$.

The power loss can be expressed $$P_t = f_3 (\eta, \alpha, \gamma, h_2, h_0)$$

or, by considering the presumptions $$P_t = f_4 (\Delta t, \alpha, \gamma h_2, h_0)$$

or $$P_t = f_5 [f_2(P_t), \alpha, \gamma h_2, h_0]$$

or $$t = f_6 (\Delta t, \alpha, \gamma h_2, h_0) \tag{1}$$

The following limits are relevant:

$$0 < \alpha < \pi/2$$
$$0 < \gamma < \infty$$
$$0 < h_2 < h_2^x$$
$$0 < h_0 < h_0^x$$

where $h_2^x$ and $h_0^x$ are chosen from a practical point of view.

For each combination of $\alpha, \gamma, h_2$ and $h_0$ it is possible to solve a value of $\Delta t$ from equation (1). This in turn determines the viscosity and the corresponding carrying capacity $W_t$. The mathematical problem can be formulated to find a combina of $\alpha, \gamma, h_2$ and $h_0$ which has the greatest $h_2$-value simultaneously fulfilling the condition that $W_t$ is equal to the external axial load $F_a$. For making this analysis the following auxiliary function can be studied:

$$f_7 (h_2, W_t) = 1/h_2 + C_1(W_t - F_a)^2$$

where $C_1$ is an arbitrary constant.

The search for optimum parameters can readily be automized in computer programs.

Figure 3:
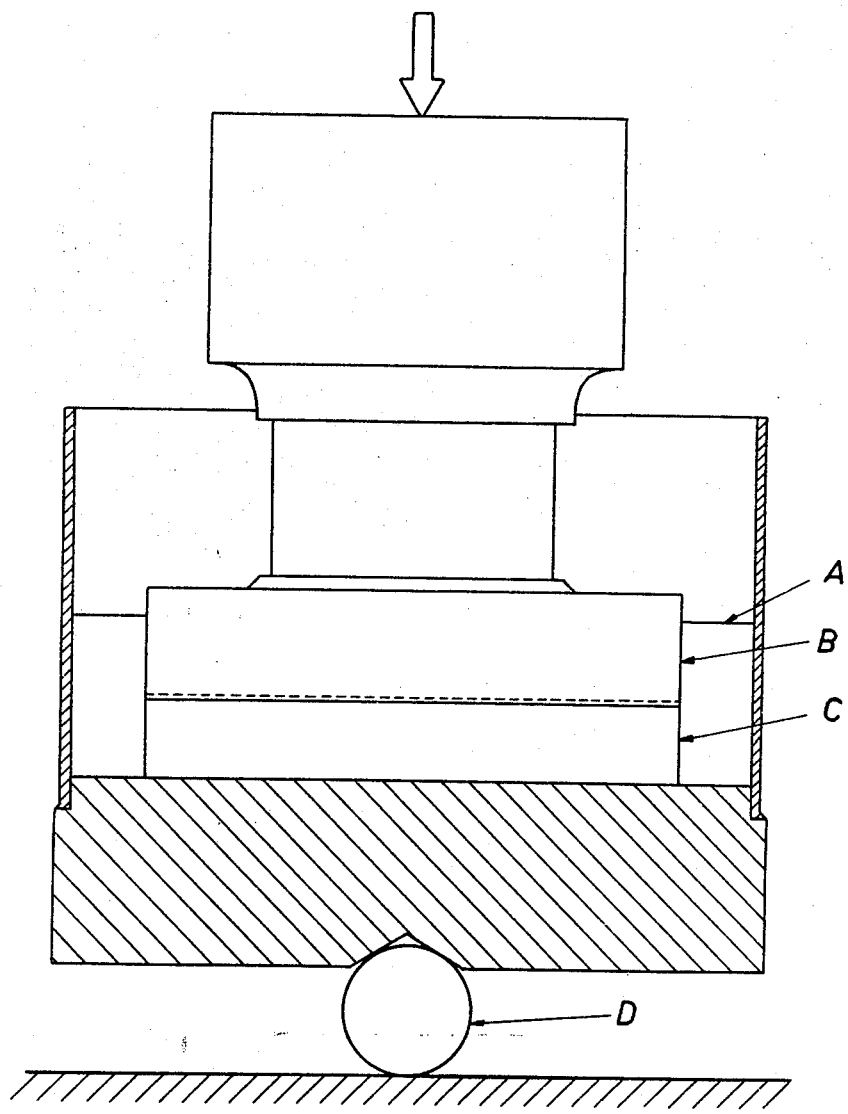
FIG. 3 shows a simplified model of a spiral groove bearing which was used in tests.

In order to obtain an optimum groove pattern for the actual bearing arrangement a simplified model according to FIG. 3 has been studied. This figure shows a plain spiral groove bearing having an upper disc B and a lower disc C, having the spiral groove pattern formed in the surface between the two discs. The lubricant is supplied from an oil bath, having a level A. A ball D is arranged in the bearing for providing self-alignment of the lower disc.

Calculation of the temperature distribution together with tests when temperatures were measured gave quite good information about the relation between temperature rise and power loss.

The design of the groove pattern was optimized according to the different methods outlined in the previous section. From the results of the analysis some important conclusions can be drawn. This will be seen from the list below.

| Bearing type | Design rule | Temp. rise degrees ($\Delta t$) | Power loss watts ($P_t$) | Film thickness microns ($h_2$) | $\delta = \frac{h_2}{h_0}$ |
|---|---|---|---|---|---|
| I | Maximization of the quantity $\frac{W_t \cdot h_2^2}{r \cdot \omega \cdot r_2^4}$ | 101 | 183 | 16.2 | 0.31 |
| II | Maximization of $h_2$. | 89 | 162 | 17.1 | 0.20 |

| Bearing type | Groove depth, microns ($h_0$) | Groove angle, degrees ($\alpha$) | Riedge/groove, ratio ($\gamma$) |
|---|---|---|---|
| I | 52 | 12 | 1.17 |
| II | 85 | 6.7 | 0.57 |

The figures in the three first columns concern the performance of the two different spiral groove bearings and they show the following: Bearing II has a thicker film than bearing I. It also gives 12 percent lower temperature rise.

The oil film thickness is not sensitive to the groove pattern design.

The data in the three last columns are closely related to the manufacture.

It can be seen that the variant II has considerably smaller groove angles, narrower ridges and deeper grooves than variant I.

By studying a spiral groove bearing having fixed inner and outer diameters which is acted upon by a specified axial load and working in a specified oil it has been possible to establish that a great variation in the cooling conditions only gives a relatively small variation in the parameters $\alpha$, $\gamma$ and $\delta$, when maximum film-thickness is desirable. The invention is in no respect limited to be applied to plain spiral groove bearings but can be applied in such bearings having for instance, spherical, tapered or another form of the bearing surfaces.

What we claim is:

1. A bearing assembly comprising at least one pair of bearing elements adapted for relative rotation and having confronting bearing surfaces, one of the bearing surfaces being formed with a plurality of spiral grooves, forming a groove pattern, the spiral grooves defining an angle $\alpha$ within the limits $6° \leq \alpha \leq 9°$ which angle ($\alpha$) is measured between the tangent to the groove and a circle at the point of intersection between the groove and circle having a center at the center of the groove pattern, the ratio of the arc length ($a_2$) of the ridges between adjacent grooves and the arc length ($a_1$) of the grooves along said circle defined as ($\gamma$) being within the limits $0.5 \leq \gamma \leq 0.7$, the parameters $\alpha$ and $\gamma$ being determined upon an analysis bearing upon maximum film thickness of lubricant, taking into consideration that the parameter of the load $$W_t \cdot h_2^2 1 \eta \cdot \omega \cdot r_2^4$$

and the parameter of the friction $M_t 1 h_2 \cdot W_1$
are depending on each other in such a way that the energy of friction ($M_t \cdot \omega$) settles the temperature of the pump medium, which in turn will influence the value of the viscosity $\eta$ of the lubricant.

* * * * *

UNITED STATES PATENT OFFICE
CERTIFICATE OF CORRECTION

Patent No. 3,663,074            Dated May 16, 1972

Inventor(s) LARS MARTIN INGEMAR FERNLUND and ERIK M. KELLSTROM

It is certified that error appears in the above-identified patent and that said Letters Patent are hereby corrected as shown below:

Column 1, line 19 and Column 4, line 30;

"$W_t \cdot h_2^2 \; 1 \; \eta \cdot \omega \cdot r_2^4$" should read --$W_t \cdot h_2^2 / \eta \cdot \omega \cdot r_2^4$--

Column 4, line 31; "$M_t \; 1 \; h_2 \cdot W_1$" should read --$M_t / h_2 \cdot W_1$--

Signed and sealed this 2nd day of January 1973.

(SEAL)
Attest:

EDWARD M. FLETCHER, JR.             ROBERT GOTTSCHALK
Attesting Officer                     Commissioner of Patents